Patented May 10, 1938

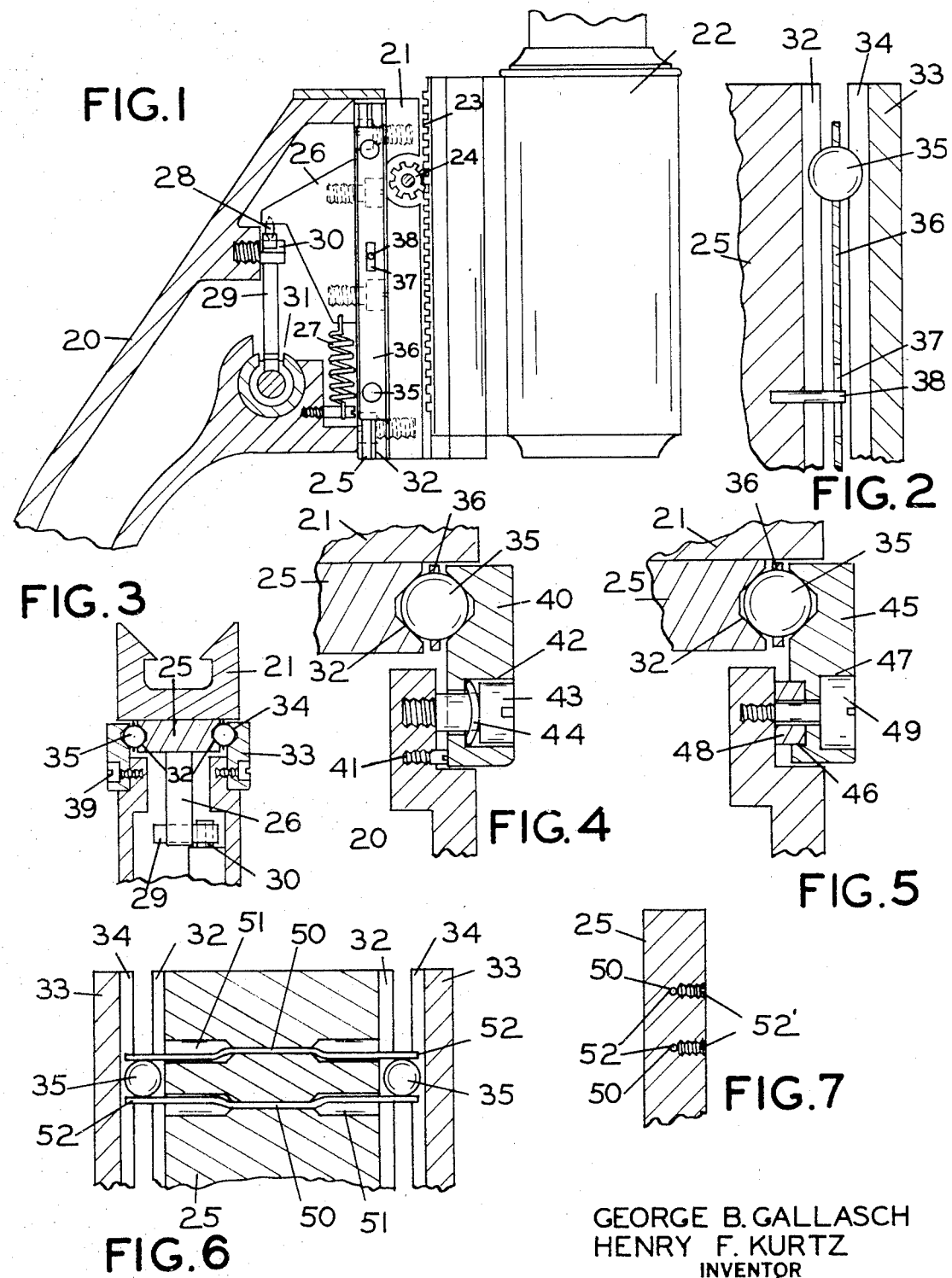

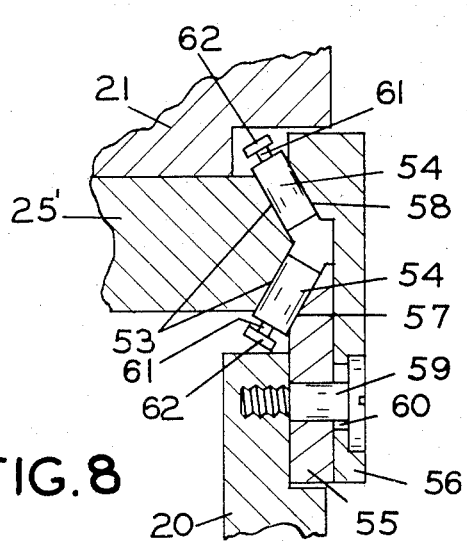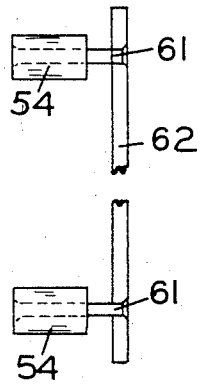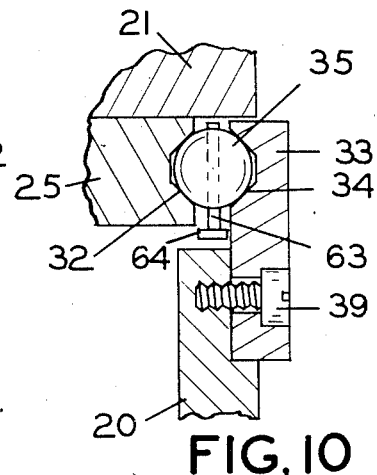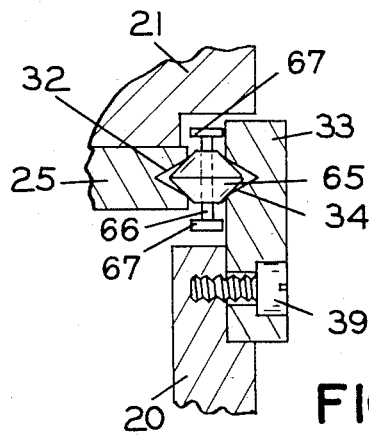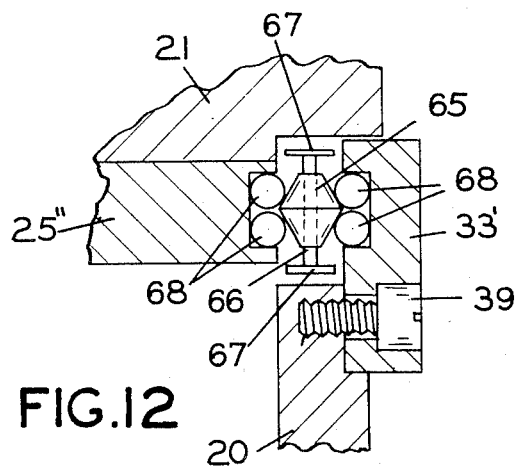

2,117,161

UNITED STATES PATENT OFFICE 2,117,161

MICROSCOPE

George B. Gallasch and Henry F. Kurtz, Rochester, N. Y., assignors to Bausch & Lomb Optical Company, Rochester, N. Y., a corporation of New York Application June 27, 1935, Serial No. 28,683

14 Claims. (Cl. 88—39)

The present invention relates to microscopes and more particularly to a fine adjustment slide mounting for a microscope.

One of the objects of the present invention is to provide a microscope slide mounting which is simple and easy to manufacture yet accurate and durable in operation. Another object is to provide a microscope slide mounting having freely rotatable bearing elements. A further object is to provide a microscope slide mounting having freely rotatable bearings and spacing means beyond the bearing guides. These and other objects and advantages reside in certain novel features of construction, arrangement and combination of parts as will hereinafter be more fully set forth and pointed out in the appended claims.

Referring to the drawings:

Fig. 1 is a side elevation of a microscope with parts in section.

Fig. 2 is a fragmentary vertical section showing the bearing race.

Fig. 3 is a fragmentary horizontal section showing the slide mounting.

Figs. 4 and 5 are fragmentary horizontal sections showing different forms of mounting for the gib.

Fig. 6 is a fragmentary vertical section showing a modified form of spacing means.

Fig. 7 is a fragmentary vertical section taken at right angles to Fig. 6.

Fig. 8 is a fragmentary horizontal section of a roller bearing mounting.

Fig. 9 is an elevation of the spacing means for the rollers of Fig. 7.

Figs. 10, 11 and 12 are fragmentary horizontal sections of modified forms of slide mounting.

Referring to Figs. 1 to 3, 20 indicates the microscope arm on which the slide 21, carrying the microscope tube 22, is slidably mounted. Coarse focusing adjustment of the tube 22 is effected by the rack 23 and the pinion 24 as is well known in the art. Fixed to the rear of the slide 21 is a guide block 25 carrying a bracket 26 which is urged downwardly by a spring 27 and is held against the action of the spring 27 by a pin 28 and a lever 29 fulcrumed at 30 on the arm 20. The other end of the lever 29 is actuated by a suitable mechanism 31 to obtain fine adjustment of focus. One suitable form for the adjustment mechanism 31 is that disclosed in the application of Henry F. Kurtz for a Microscope, Serial No. 746,235 filed September 29, 1934. However, any suitable mechanism can be used as the particular structure of the adjustment mechanism forms no part of the present invention.

Two outwardly facing parallel grooves or guides 32 are formed one on each side, in the guide block 25 to serve as bearing races. A pair of gibs 33 are fixed on the arm 20 overlying the guide block 25 and each gib has an inwardly facing groove or guide 34, complemental to the adjacent groove 32 on the guide block 25. A plurality of balls 35, held in spaced relation by a cage 36 are mounted in the races formed by the grooves 32 and 34 and serve as bearings. The cage 36 is formed with a central aperture 37 which cooperates with a pin 38 on the block 25 to limit the movement of the cage and balls. This limiting means can also be used with the forms shown in Figs. 8 to 12. In the form shown in Fig. 3, both gibs 33 are rigidly fixed to the arm 20 by screws 39 and must be made with great accuracy to secure the proper alignment of the bearing races.

Fig. 4 illustrates a floating or self-aligning gib 40. In this construction a pin or screw 41 is fixed in the arm 20 adjacent the rear edge of the gib 40 and at substantially the longitudinal center of the gib. The screw hole 42 in the gib 40 is made larger than the single screw 43 and a spring washer 44 is used between the screw 43 and the gib 40. In this way the gib 40 has a small amount of free movement so that the groove 34 may align itself with the groove 32. The other gib 33 in this modification is fixed.

Fig. 5 shows an alternative form of adjustable gib. Here the gib 45 is provided with a countersink 46 in its inner surface concentric with the screw hole 47. A washer 48 which fits around the screw 49 is placed in the countersink 46. In assembling this type of mounting the washer 48 may be either interchangeable or may be secured in the countersink 46 and rubbed down to obtain the proper fit. The gib 45 is held against any tilting movement by using two or more screws 49 spaced along its length.

Figs. 6 and 7 illustrate an alternative spacing means for the bearings 35. Apertures 50, enlarged at each end as shown at 51, are formed in the guide block 25 and a resilient wire or rod 52 is secured in each opening by a set screw 52' and extends outwardly into both bearing races. The balls 35 rest between these wires or rods 52 and their resilience permits the balls the necessary freedom of movement. Obviously any form of gib mounting can be used in Fig. 6 just as the bearing spacing means of Fig. 6 can be used with any gib mounting.

Figs. 8 and 9 illustrate a mounting using roller bearings. Here the block 25' is formed with angularly related flat bearing surfaces 53 for the cylindrical roller bearings 54. Mounted on the arm 20 are two plates 55 and 56 having the flat bearing surfaces 57 and 58 respectively. The plates 55 and 56 are secured to the arm 20 by a screw 59 and the outer plate 56 has a slot 60 so that an adjustment for wear can be made. Each bearing 54 is rotatably mounted on an axle 61 which extends beyond the bearing surfaces 53, 57 and 58, and these axles 61 are held in spaced relation by a member 62. The guides and bearings are duplicated on the other side of the guide block 25'.

In the embodiment shown in Fig. 10, each ball 35 has a pin 63 fixed therein and extending beyond the bearing guides 32 and 34 in the block 25 and gib 33. A spacing member 64 engages the pins 63 and serves to hold the balls 35 in spaced relation. A similar spacing member 64 may be used on the other side of the ball 35.

In the embodiment shown in Fig. 11, the rotatable bearings 65 are conically tapered from the center toward the edges. A pin 66 is fixed in each bearing and extends outwardly from between the block 25 and gib 33 and is engaged by a spacing element 67. The principle of operation of the form shown in Fig. 12 is identical with that shown in Fig. 11. In the form shown in Fig. 12 instead of grooves 32 and 34 the guide block 25'' and gib 33' each hold two cylindrical rods 68 which serve as bearing guides for the bearings 65. In the forms shown in Figs. 10 to 12 it is shown that the bearings may be held in spaced relation by resilient wires or rods acting upon the pins.

From the foregoing it will be apparent that we are able to attain the objects of our invention and provide an accurate and rugged microscope slide mounting using freely rotatable bearing elements. It is obvious that the guide block and gibs may be reversed, that is, the guide block secured to the arm and the gibs secured to the microscope tube slide member. Various other modifications can also be made without departing from the spirit of our invention or the scope of the appended claims.

We claim:

1. In a microscope a supporting member, a microscope tube member slidably mounted thereon, spaced gibs on one of said members, an inwardly facing bearing guide on each gib, said races being substantially parallel, a block on the other member adapted to extend between said gibs, an outwardly facing bearing guide on each side of said tongue complemental to the guide on the adjacent gib, a plurality of freely rotatable elements in said guides, and a resilient member extending through said block into said guides to hold said elements in spaced relation.

2. In a microscope a supporting member, a microscope tube member slidably mounted thereon, spaced gibs on one of said members, an inwardly facing bearing groove on each gib, said grooves being substantially parallel, a block on the other member adapted to extend between said gibs, an outwardly facing bearing groove on each side of said block complemental to the groove on the adjacent gib, a plurality of freely rotatable bearing elements in each pair of grooves, cage means for said elements and stop means secured to one of said members for limiting the movement of said cage means.

3. In a microscope a supporting member, a microscope tube member, a block on one member having an outwardly facing bearing groove in each side, said grooves being substantially parallel, a pair of spaced gibs on the other member adapted to overlie said block, an inwardly facing bearing groove on each gib, a plurality of freely rotatable bearing elements in said grooves, means for securing said gibs to said other member and removable spacing means between one gib and said other member.

4. In a microscope a supporting member, a microscope tube member, a guide block on one member having an outwardly bearing groove in each side, said grooves being substantially parallel, a pair of spaced gibs on the second member adapted to overlie said block, an inwardly facing groove in each gib complemental to the adjacent groove in the block, a plurality of freely rotatable bearings in said grooves, means for rigidly securing one gib to said second member, and means for resiliently mounting the second gib on said second member whereby said second gib is self-aligning.

5. In a microscope a supporting member and a microscope tube member, a guide block on one member having an outwardly facing bearing groove in each side, said grooves being substantially parallel, a pair of spaced gibs on the second member adapted to overlie said block, an inwardly facing bearing groove in each gib, a plurality of freely rotatable bearings in said grooves, means for rigidly fixing one gib to said second member, means on said second member for rockably supporting the second gib at a point adjacent its ungrooved edge, and resilient means between said supporting means and said groove to urge said gib into contact with said bearings.

6. In a microscope a supporting member, a microscope tube member, complemental bearing guides on said members, a plurality of freely rotatable bearings between said guides, pivots for said bearings, and means beyond said guides for holding said pivots in spaced relation.

7. In a microscope a supporting member and a microscope tube member, complemental bearing guides on said members, a plurality of freely rotatable bearings in said guides, portions on said bearings extending outwardly beyond said guides, and spacing means, also beyond said guides, engaging said portions and holding said bearings in spaced relation.

8. In a microscope, a hollow arm having a vertical opening therein, two substantially parallel, vertical inwardly facing bearing guides mounted on said arm, one on each side of said opening, a microscope tube, a block secured to said tube, said block having two substantially parallel, outwardly facing guides in alignment with said first-mentioned guides, a plurality of freely rotatable elements between each pair of guides, a projection on said block extending into the hollow of said arm, and means within said arm and engaging said projection for moving said microscope tube.

9. In a microscope, a hollow arm member having a vertical opening therein, two substantially parallel, vertical, inwardly facing bearing guides mounted on said arm, one on each side of said opening, a microscope tube member, a block secured to said tube, said block having two substantially parallel, outwardly facing guides in alignment with said first-mentioned guides, a plurality of freely rotatable bearing elements in each pair of guides, cage means for said plurality of elements, stop means on one of said members for limiting the movement of said cage means, and means in said arm cooperating with said block through said opening for moving said body tube.

10. In a microscope a supporting member, a microscope tube member slidably mounted thereon, spaced gibs on one of said members, an inwardy facing bearing groove on each gib, said grooves being substantially parallel, a block on the other member adapted to extend between said gibs, an outwardly facing bearing groove on each side of said block complemental to the groove on the adjacent gib, a plurality of freely rotatable bearing elements in each pair of grooves, cage means for said elements, stop means secured to one of said members for limiting the movement of said cage means, a fine adjustment means carried by said supporting member and operating means actuated by said fine adjustment means to move said block and said gibs relatively to focus said microscope tube.

11. In a microscope, a supporting member, a microscope tube member, a block on one member having an outwardly facing bearing groove in each side, said grooves being substantially parallel, a pair of spaced gibs on the other member adapted to overlie said block, an inwardly facing bearing groove on each gib, a plurality of freely rotatable bearing elements in said grooves, means for securing said gibs to said other member, and means for sliding said block between said gibs on said bearing elements to move said tube member relative to said support.

12. In a microscope, a supporting member, a microscope tube member, a block on one member having an outwardly facing bearing groove in each side, said grooves being substantially parallel, a pair of spaced gibs on the other member adapted to overlie said block, an inwardly facing bearing groove on each gib, a plurality of freely rotatable bearing elements in said grooves, means for securing said gibs to said other member, a microscope fine adjustment mechanism mounted in said support, and means operatively interconnecting said fine adjustment mechanism to said microscope tube to cause said microscope tube to move on said bearing elements for focusing.

13. In a microscope a supporting member, a microscope tube member, a guide block on one member having an outwardly bearing groove in each side, said grooves being substantially parallel, a pair of spaced gibs on the second member adapted to overlie said block, an inwardly facing groove in each gib complemental to the adjacent groove in the block, a plurality of freely rotatable bearings in said grooves, means for rigidly securing one gib to said second member, means for resiliently mounting the second gib on said second member whereby said second gib is self-aligning, and means for sliding said block between said gibs on said bearings to focus said microscope tube member.

14. In a microscope a supporting member and a microscope tube member, complemental bearing guides on said members, a plurality of freely rotatable bearings in said guides, portions on said bearings extending outwardly beyond said guides, spacing means, also beyond said guides, engaging said portions and holding said bearings in spaced relation, a microscope fine adjustment mechanism carried by said supporting member and means operatively interconnecting said mechanism to said tube member to focus said tube member.

GEORGE B. GALLASCH.
HENRY F. KURTZ.